(12) United States Patent
Matsuoka (10) Patent No.: US 6,594,568 B2
(45) Date of Patent: Jul. 15, 2003

(54) ELECTRIC POWER STEERING APPARATUS (75) Inventor: Hirofumi Matsuoka, Kyoto (JP)

(73) Assignee: Koyo Seiko Co., Ltd., Osaka (JP)

( * ) Notice: Subject to any disclaimer, the term of this patent is extended or adjusted under 35 U.S.C. 154(b) by 119 days.

(21) Appl. No.: 09/816,545

(22) Filed: Mar. 23, 2001

(65) Prior Publication Data
US 2001/0027364 A1 Oct. 4, 2001

(30) Foreign Application Priority Data
Mar. 28, 2000 (JP) ........................................ 2000-089970

(51) Int. Cl.[7] ................................................ G06F 7/00
(52) U.S. Cl. ........................................ 701/41; 180/446
(58) Field of Search ...................... 701/41, 42; 180/446, 180/444, 443; 318/599

(56) References Cited

U.S. PATENT DOCUMENTS

| 5,076,381 A | * | 12/1991 | Daido et al. ............... 180/446 |
| 5,528,497 A | * | 6/1996 | Yamamoto et al. ........... 701/41 |
| 5,740,040 A | * | 4/1998 | Kifuku et al. ................ 701/41 |
| 6,360,151 B1 | * | 3/2002 | Suzuki et al. ................ 701/41 |

FOREIGN PATENT DOCUMENTS

JP  2694213  9/1997

* cited by examiner

Primary Examiner—Gertrude Arthur
(74) Attorney, Agent, or Firm—Darby & Darby (57) ABSTRACT An electric power steering apparatus comprising a torque detector 6 for detecting a steering torque applied to a steering wheel (not shown) and a steering assist motor 8 which is driven under control based on a drive current corresponding to the steering torque detected by the torque detector 6. By further comprising an angle detector 20 for detecting a turn angle of the steering wheel, angular velocity calculating means 23 for calculating an angular velocity of turn of the steering wheel from the turn angle detected by the angle detector 20, friction compensating unit 24 for calculating an angular acceleration of turn of the steering wheel for friction compensation from the angular velocity of turn calculated by the angular velocity calculating means 23 and adding means 24d, 25 for adding a current related to the angular velocity of turn and a current related to the angular acceleration of turn calculated by the friction compensating unit 24 to the drive current, friction compensation is performed at the start of steering, more accurate friction compensation of a steering system is carried out, and an electric power steering apparatus having a good feel of steering is achieved.

3 Claims, 6 Drawing Sheets

ELECTRIC POWER STEERING APPARATUS

BACKGROUND OF THE INVENTION

The present invention relates to an electric power steering apparatus for detecting a steering torque applied to a steering wheel and controlling driving of a steering assist motor according to the detected steering torque.

An electric power steering apparatus, which controls driving of a steering assist motor based on a result of detection of steering torque applied to a steering wheel and assists power required for steering an automobile by the torque of the motor so as to give a comfortable steering feel to a driver, has spread.

Figure 1:
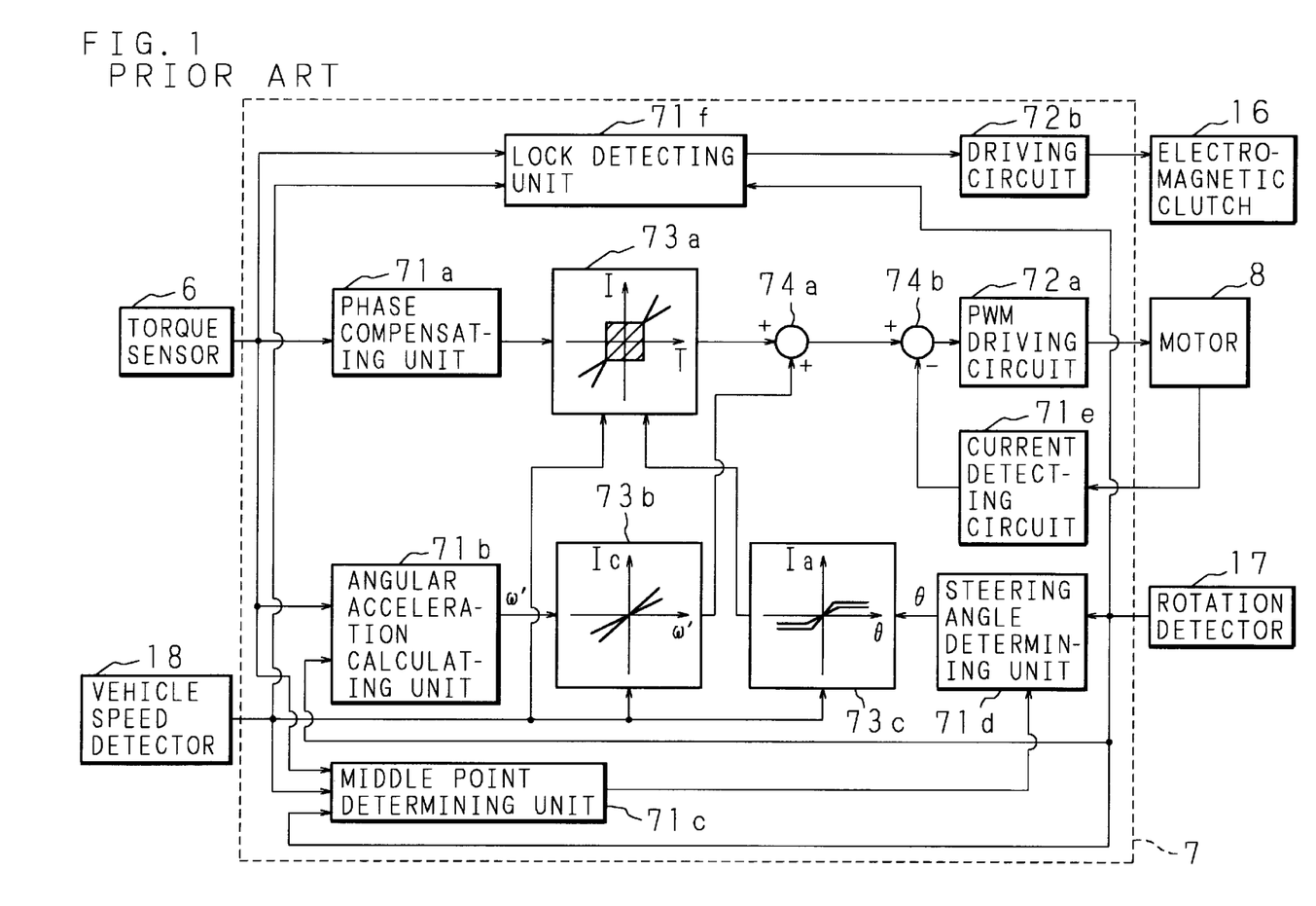
FIG. 1 is a block diagram showing an example of the constitution of a conventional electric power steering apparatus.

FIG. 1 is a block diagram showing an example of the constitution of "a power steering apparatus" proposed by the assignee of the present application in Japanese Patent No. 2694213.

In this power steering apparatus as an electric power steering apparatus, an output signal of a torque sensor 6 is inputted to a control unit 7. The control unit 7 supplies a drive signal to a steering assist motor 8 based on this output signal. The steering assist motor 8 transmits its torque to the lower shaft of a steering shaft.

The torque sensor 6 detects, as the steering torque applied to a steering wheel, a relative displacement in a circumferential direction which is generated between the upper and lower shafts of the steering shaft turning about the axis of the steering wheel according to turn of the steering wheel with twist of a torsion bar interposed between the upper and lower shafts.

A rotation detector 17 for detecting a rotational position of the motor 8 is attached to the rotation shaft of the motor 8.

The control unit 7 is supplied with a rotation detection signal of the rotation detector 17 and an output signal of a vehicle speed detector 18 for detecting a vehicle speed as well as the above-mentioned output signal of the torque sensor 6, and outputs a drive signal for driving the motor 8 and an electromagnetic clutch 16.

A torque detection signal outputted by the torque sensor 6 is supplied to each of a phase compensating unit 71a for stabilizing a system by advancing the phase of the torque detection signal, an angular acceleration calculating unit 71b for calculating an angular acceleration $\omega'$ of turn of the steering wheel, a middle point determining unit 71c for determining the middle point of the steering wheel of a vehicle traveling in a straight direction, and a lock detecting unit 71f for detecting whether the motor 8 is locked.

Moreover, a vehicle speed detection signal outputted by the vehicle speed detector 18 is supplied to each of the lock detecting unit 71f, middle point determining unit 71c, directing current function unit 73a, correction current function unit 73b and change current function unit 73c.

The directing current function unit 73a is supplied with an output signal of the phase compensating unit 71a and a later-described change current Ia, determines a directing current I for the motor 8 based on the steering torque, change current Ia and vehicle speed detection signal, and outputs the determined directing current I.

The correction current function unit 73b is supplied with the angular acceleration $\omega'$ of the steering wheel outputted by the angular acceleration calculating unit 71b, determines a correction current Ic for correcting the force of inertia of the motor 8 during acceleration and deceleration and the force of inertia of the traveling system of the vehicle based on the angular acceleration $\omega'$ and vehicle speed detection signal, and outputs the determined correction current Ic.

The change current function unit 73c is supplied with a steering angle $\theta$ outputted from a later-described steering angle determining unit 71d, determines a change current Ia for changing the characteristic of the directing current I based on the steering angle $\theta$ and vehicle speed detection signal, and outputs the determined change current Ia.

The rotation detection signal of the rotation detector 17 is supplied to the lock detecting unit 7 If, middle point determining unit 71c, angular acceleration calculating unit 71b and steering angle determining unit 71d.

The steering angle determining unit 71d determines a steering angle $\theta$ based on the rotation detection signal and the middle point determined by the middle point determining unit 71c, and outputs the determined steering angle $\theta$.

The lock detecting unit 71f detects whether the motor 8 is locked, based on the rotation detection signal, when the supplied torque detection signal and vehicle speed detection signal are larger than their predetermined values, respectively. When the lock detecting unit 71f detects that the motor 8 is locked, a driving circuit 72b disconnects the electromagnetic clutch 16.

The output signal of the directing current function unit 73a and the output signal of the correction current function unit 73b are added together by an adder 74a, and the result of addition is supplied to an error amplifier 74b. The error amplifier 74b calculates the difference between the result of addition and a feedback signal from a current detecting circuit 71e for detecting a current flowing in the motor 8, and a voltage corresponding to the calculation result is supplied to the motor 8 by a PWM (Pulse Width Modulation) driving circuit 72a.

The following description will explain an operation of an electric power steering apparatus having such structures.

The directing current function unit 73a determines a directing current I for the motor 8 based on the torque detection signal whose phase has been compensated by the phase compensating unit 71a, the change current Ia outputted by the change current function unit 73c and the vehicle speed detection signal outputted by the vehicle speed detector 18, and outputs the determined directing current I.

Meanwhile, the change current function unit 73c determines a change current Ia for changing the characteristic of the directing current I, based on the steering angle $\theta$ given by the steering angle determining unit 71d and the vehicle speed detection signal outputted by the vehicle speed detector 18, and outputs the determined change current Ia.

The angular acceleration calculating unit 71b reads a torque detection signal T supplied from the torque sensor 6 and a motor rotational speed $\omega_m$ of the motor 8 supplied from the rotation detector 17, and calculates the angular acceleration $\omega'$ of the steering wheel according to the following equation.

$$\omega'=T''/K+\omega_m'/n \quad (1)$$

Here, equation (1) can be given by the following equations.

$$T=K(\theta_i-\theta_o)$$

where
$\theta_i$: a steering angle of the upper shaft of the steering shaft,
$\theta_o$: a steering angle of the lower shaft of the steering shaft, K: a spring constant of the torsion bar.

$$\theta_i - \theta_o = T/K$$

$$\theta_i'' - \theta_o'' = T''/K$$

$$\theta_i'' = T''K + \theta_o'' \quad (2)$$

Meanwhile, $$\theta_o' = \omega_m/n$$

$$\theta_o'' = \omega_m'/n$$

(n: the deceleration ratio of the motor rotation shaft to the lower shaft)

∴ According to equation (2), $$\theta_i'' = \omega' = T''/K + \omega_m'/n \quad (1)$$

The correction current function unit 73b calculates a correction current Ic for correcting the effects of the force of inertia of the motor 8 and the force of inertia of the traveling system of the vehicle, based on the angular acceleration ω' calculated by the angular acceleration calculating unit 71b and a vehicle speed detection signal V outputted by the vehicle speed detector 18.

The adder 74a adds the correction current Ic calculated by the correction current function unit 73b to the directing current I calculated by the directing current function unit 73a, and outputs the resultant current. Hence, it is possible to improve a feel of steering.

The error amplifier 74b calculates the difference between the result of addition outputted by the adder 74a and a current flowing in the motor 8 detected by the current detecting circuit 71e, and supplies a voltage corresponding to the calculation result to the PWM driving circuit 72a. The PWM driving circuit 72a controls driving of the motor 8 according to the supplied voltage.

In the above-described electric power steering apparatus, the effects of the force of inertia of the motor 8 and the force of inertia of the traveling system of the vehicle are compensated using the motor rotational speed $\omega_m$ of the motor 8 supplied from the rotation detector 17, and thus there is a problem that the cost of the parts of the rotation detector 17 is required.

Moreover, although not shown in the drawings, friction compensation of the steering system is performed by controlling a motor current flowing in the motor 8 based on the motor rotational speed $\omega_m$ of the motor 8 detected by the rotation detector 17, but the torsion bar of the torque sensor 6 twists and the motor 8 does not rotate from the start of steering made by the driver until the friction compensation overcomes the friction torque of the motor 8 and reduction gear. Therefore, friction compensation is not carried out at the start of steering and control of friction compensation is started slightly later, resulting in a problem that the effect of friction compensation is small.

BRIEF SUMMARY OF THE INVENTION

An object of the present invention is to provide an electric power steering apparatus capable of solving the above problems.

An electric power steering apparatus according to the first invention, being provided with a torque detector for detecting a steering torque applied to a steering wheel and a steering assist motor which is driven under control based on a drive current corresponding to the steering torque detected by the torque detector, is characterized by comprising: an angle detector for detecting a turn angle of the steering wheel; angular velocity calculating means for calculating an angular velocity of turn of the steering wheel from the turn angle detected by the angle detector; friction compensating means for calculating an angular acceleration of turn of the steering wheel for friction compensation from the angular velocity of turn calculated by the angular velocity calculating means; and adding means for adding a current related to the angular velocity of turn and a current related to the angular acceleration of turn calculated by the friction compensating means to the drive current.

In this electric power steering apparatus, the torque detector detects a steering torque applied to the steering wheel, and driving of the steering assist motor is controlled based on a drive current corresponding to the detected steering torque. The angle detector detects a turn angle of the steering wheel, and the angular velocity calculating means calculates an angular velocity of turn of the steering wheel from the detected turn angle. The friction compensating means calculates angular acceleration of turn of the steering wheel for friction compensation from the angular velocity of turn calculated by the angular velocity calculating means, and the adding means adds a current related to the angular velocity of turn and a current related to the angular acceleration of turn calculated by the friction compensating means to the drive current.

Accordingly, friction compensation is performed at the start of steering and more accurate friction compensation of a steering system is carried out, thereby achieving an electric power steering apparatus having a good feel of steering.

An electric power steering apparatus according to the second invention, being provided with a torque detector for detecting a steering torque applied to a steering wheel and a steering assist motor which is driven under control based on a drive current corresponding to the steering torque detected by the torque detector, is characterized by comprising: a current detecting circuit for detecting a current flowing in the motor; a voltage detecting circuit for detecting a voltage applied to the motor; motor rotational speed calculating means for calculating a rotational speed of the motor based on the current detected by the current detecting circuit and the voltage detected by the voltage detecting circuit; angular acceleration calculating means for calculating an angular acceleration of turn of the steering wheel by adding up a value corresponding to first-order differentiation of the rotational speed calculated by the motor rotational speed calculating means and a value corresponding to second-order differentiation of the steering torque; and adding means for adding a current determined in relation to the angular acceleration of turn calculated by the angular acceleration calculating means to the drive current.

In this electric power steering apparatus, the torque detector detects a steering torque applied to a steering wheel, and driving of the steering assist motor is controlled based on a drive current corresponding to the detected steering torque. The current detecting circuit detects a current flowing in the motor, and the voltage detecting circuit detects a voltage applied to the motor. The motor rotational speed calculating means calculates a rotational speed of the motor based on the current detected by the current detecting circuit and the voltage detected by the voltage detecting circuit, and the angular acceleration calculating means calculates angular acceleration of turn of the steering wheel by adding up a value corresponding to first-order differentiation of the rotational speed calculated by the motor rotational speed calculating means and a value corresponding to second-order differentiation of the steering torque. The adding means adds a current determined in relation to the angular acceleration of turn calculated by the angular acceleration calculating means to the drive current.

Accordingly, it is possible to achieve an electric power steering apparatus which requires no rotation detector and enables a reduction in the cost of parts.

An electric power steering apparatus according to the third invention, being provided with a torque detector for detecting a steering torque applied to a steering wheel and a steering assist motor which is driven under control based on a drive current corresponding to the steering torque detected by the torque detector, is characterized by comprising: a current detecting circuit for detecting a current flowing in the motor; a voltage detecting circuit for detecting a voltage applied to the motor; motor rotational speed calculating means for calculating a rotational speed of the motor based on the current detected by the current detecting circuit and the voltage detected by the voltage detecting circuit; angular velocity calculating means for calculating an angular velocity of turn of the steering wheel by adding up a value related to the rotational speed calculated by the motor rotational speed calculating means and a value related to first-order differentiation of the steering torque; angular acceleration calculating means for calculating an angular acceleration of turn of the steering wheel from the angular velocity of turn calculated by the angular velocity calculating means; and adding means for adding a current related to the angular velocity of turn and a current related to the angular acceleration of turn calculated by the angular acceleration calculating means to the drive current.

In this electric power steering apparatus, the torque detector detects a steering torque applied to the steering wheel, and driving of the steering assist motor is controlled based on a drive current corresponding to the detected steering torque. The current detecting circuit detects a current flowing in the motor, and the voltage detecting circuit detects a voltage applied to the motor. The motor rotational speed calculating means calculates a rotational speed of the motor based on the current detected by the current detecting circuit and the voltage detected by the voltage detecting circuit, and the angular velocity calculating means calculates an angular velocity of turn of the steering wheel by adding up a value related to the rotational speed calculated by the motor rotational speed calculating means and a value related to first-order differentiation of the steering torque. The angular acceleration calculating means calculates angular acceleration of turn of the steering wheel from the angular velocity of turn calculated by the angular velocity calculating means, and the adding means adds a current related to the angular velocity of turn and a current related to the angular acceleration of turn calculated by the angular acceleration calculating means to the drive current.

Accordingly, friction compensation is performed at the start of steering and more accurate friction compensation of a steering system is carried out, thereby achieving an electric power steering apparatus having a good feel of steering. Moreover, it is possible to achieve an electric power steering apparatus having a good feel of steering by only changing software, without changing conventional hardware.

The above and further objects and features of the invention will more fully be apparent from the following detailed description with accompanying drawings.

DETAILED DESCRIPTION OF THE INVENTION

Figure 2:
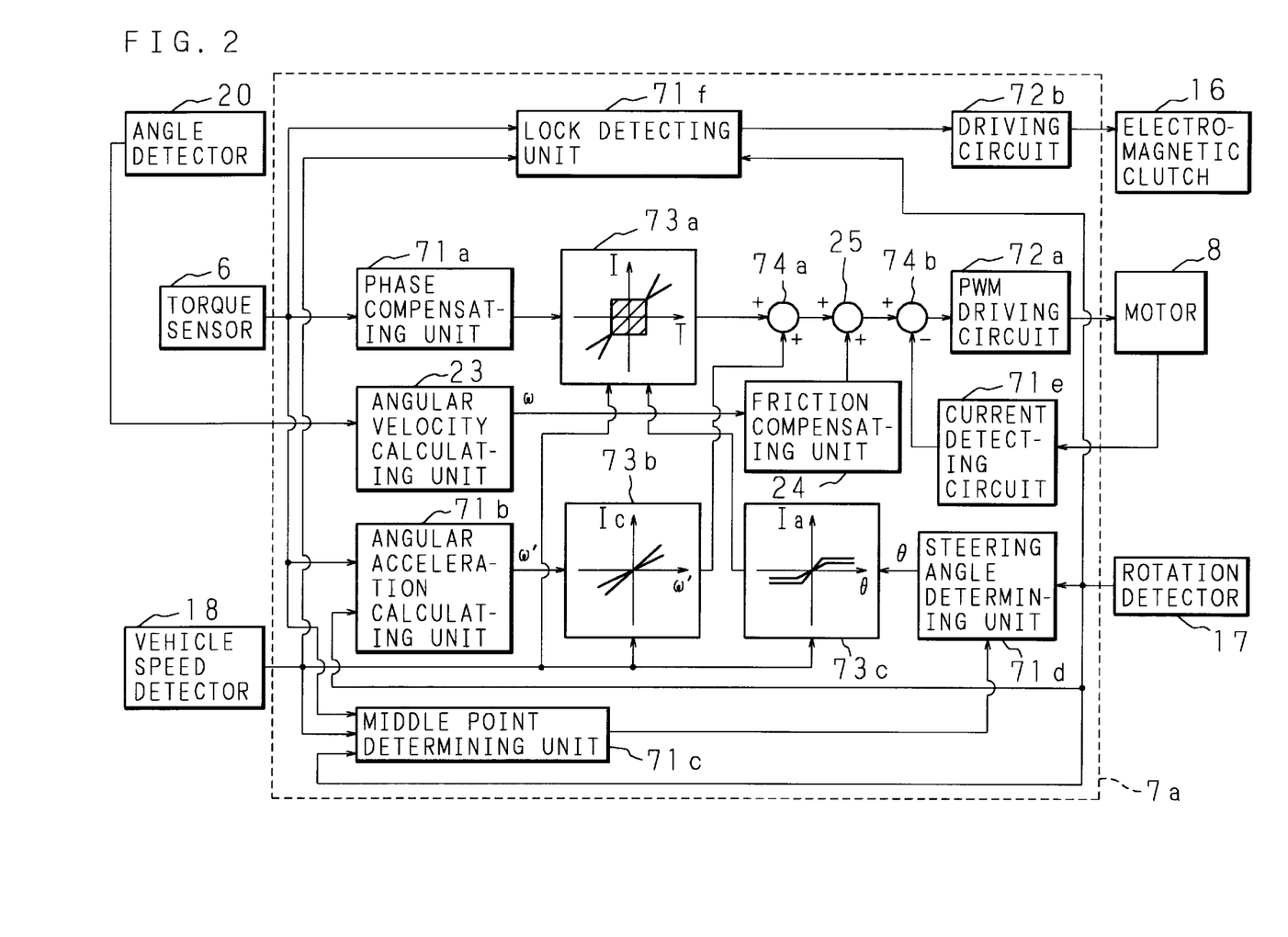
FIG. 2 is a block diagram showing the constitution of an embodiment of an electric power steering apparatus according to the present invention.

The following description will explain some embodiments of an electric power steering apparatus according to the present invention with reference to the drawings illustrating the embodiments.
First Embodiment FIG. 2 is a block diagram showing the constitution of the First Embodiment of an electric power steering apparatus according to the present invention. In this electric power steering apparatus, an output signal of a torque sensor (torque detector) 6 is inputted to a control unit 7a. The control unit 7a supplies a drive signal to a steering assist motor 8 based on this signal. The steering assist motor 8 transmits its torque to the lower shaft of a steering shaft.

The torque sensor 6 detects, as the steering torque applied to a steering wheel, a relative displacement in a circumferential direction which is generated between the upper and lower shafts of the steering shaft turning about the axis of the steering wheel according to turn of the steering wheel with twist of a torsion bar interposed between the upper and lower shafts.

A rotation detector 17 for detecting a rotational position of the motor 8 is attached to the rotation shaft of the motor 8.

The control unit 7a is supplied with a rotation detection signal of the rotation detector 17, an output signal of a vehicle speed detector 18 for detecting a vehicle speed and an output signal of an angle detector 20 for detecting a turn angle of the steering wheel as well as the above-mentioned output signal of the torque sensor 6, and outputs a drive signal for driving the motor 8 and an electromagnetic clutch 16.

A torque detection signal outputted by the torque sensor 6 is supplied to each of a phase compensating unit 71a for stabilizing a system by advancing the phase of the torque detection signal, an angular acceleration calculating unit 71b for calculating an angular acceleration ω' of turn of the steering wheel, a middle point determining unit 71c for determining the middle point of the steering wheel of the vehicle traveling in a straight direction, and a lock detecting unit 71f for detecting whether the motor 8 is locked.

Moreover, a vehicle speed detection signal outputted by the vehicle speed detector 18 is supplied to each of the lock detecting unit 71f, middle point determining unit 71c, directing current function unit 73a, correction current function unit 73b and change current function unit 73c.

The directing current function unit 73a is supplied with an output signal of the phase compensating unit 71a and a later-described change current Ia, determines a directing current I for the motor 8 based on the steering torque, change current Ia and vehicle speed detection signal, and outputs the determined directing current I.

The correction current function unit 73b is supplied with the angular acceleration ω' of the steering wheel outputted by the angular acceleration calculating unit 71b, determines a correction current Ic for correcting the force of inertia of the motor 8 during acceleration and deceleration and the force of inertia of the traveling system of the vehicle based on the angular acceleration ω' and vehicle speed detection signal, and outputs the determined correction current Ic.

The change current function unit 73c is supplied with a steering angle θ outputted from a later-described steering angle determining unit 71d, determines a change current Ia for changing the characteristic of the directing current I based on the steering angle θ and vehicle speed detection signal, and outputs the determined change current Ia.

The rotation detection signal of the rotation detector 17 is supplied to the lock detecting unit 71f, middle point determining unit 71c, angular acceleration calculating unit 71b and steering angle determining unit 71d.

The steering angle determining unit 71d determines a steering angle θ based on the rotation detection signal and the middle point determined by the middle point determining unit 71c, and outputs the determined steering angle θ.

The lock detecting unit 71f detects whether the motor 8 is locked, based on the rotation detection signal, when the supplied torque detection signal and vehicle speed detection signal are larger than their predetermined values, respectively. When the lock detecting unit 7 If detects that the motor 8 is locked, a driving circuit 72b disconnects the electromagnetic clutch 16.

An angle signal of the steering wheel outputted by the angle detector 20 is supplied to an angular velocity calculating unit (angular velocity calculating means) 23. The angular velocity calculating unit 23 calculates an angular velocity of the steering wheel by differentiating the supplied angle signal, and outputs an angular velocity signal. The angular velocity signal outputted by the angular velocity calculating unit 23 is supplied to a friction compensating unit 24. The friction compensating unit 24 generates a current for friction compensation based on the supplied angular velocity signal, and outputs the current.

The output signal of the directing current function unit 73a and the output signal of the correction current function unit 73b are added together by an adder (adding means) 74a, and an adder (adding means) 25 adds the current for friction compensation supplied from the friction compensating unit 24 to the result of addition given by the adder 74a. The result of addition given by the adder 25 is supplied to an error amplifier 74b.

The error amplifier 74b calculates the difference between the result of addition given by the adder 25 and a feedback signal from a current detecting circuit 71e for detecting a current flowing in the motor 8, and a voltage corresponding to the calculation result is supplied to the motor 8 by a PWM (Pulse Width Modulation) driving circuit 72a.

Figure 3:
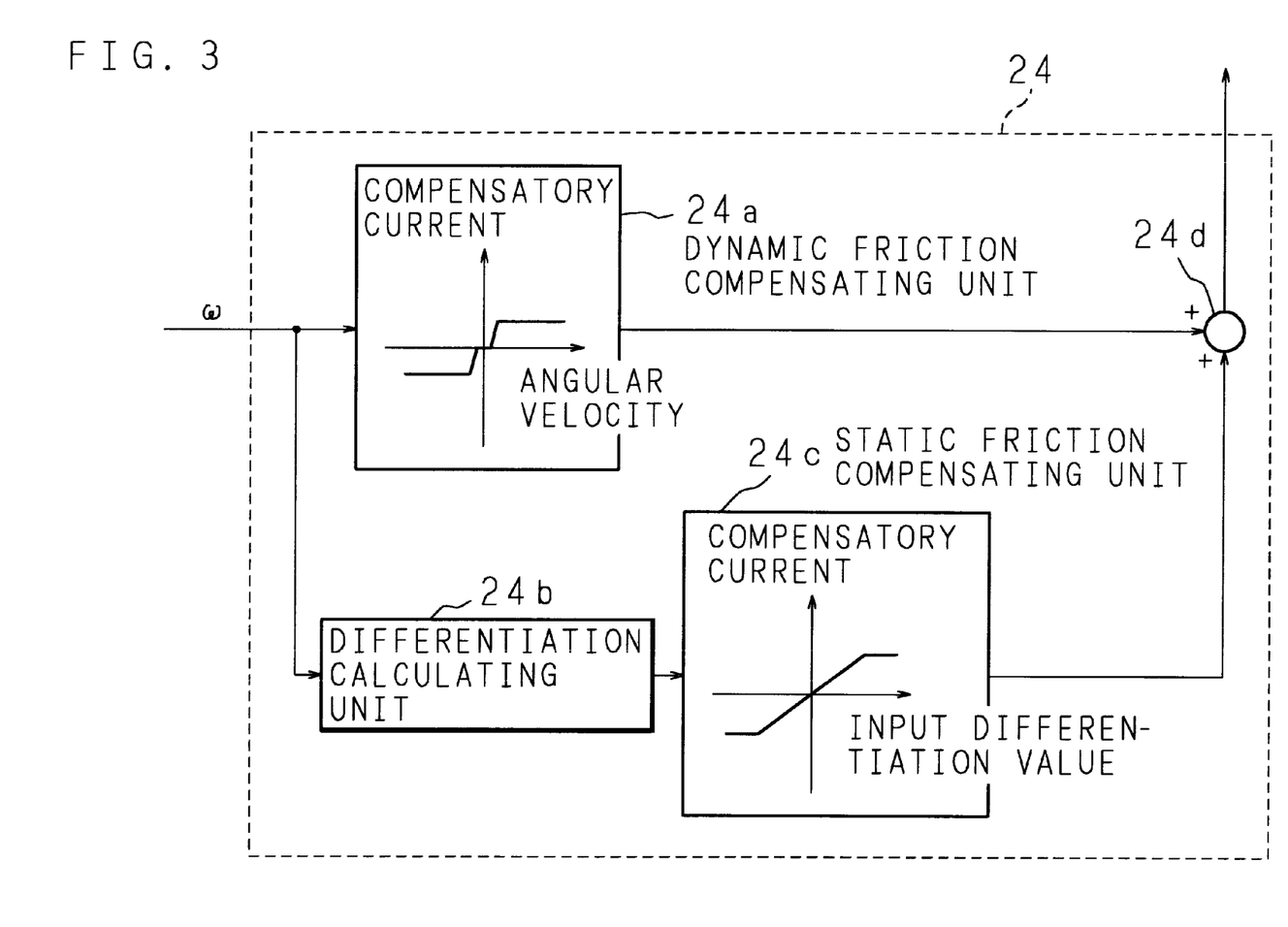
FIG. 3 is a block diagram showing an example of the constitution of a friction compensating unit.

FIG. 3 is a block diagram showing an example of the constitution of the above-described friction compensating unit 24.

In this friction compensating unit 24, the angular velocity signal ω of the steering wheel from the angular velocity calculating unit 23 is supplied to a dynamic friction compensating unit 24a and a differentiation calculating unit (differentiation calculating means) 24b.

The dynamic friction compensating unit 24a outputs a substantially constant current for dynamic friction compensation when the angular velocity signal ω is not close to zero. The differentiation calculating unit 24b differentiates the angular velocity signal ω and supplies the differential value to a static friction compensating unit (adding means) 24c. The static friction compensating unit 24c outputs a current for static friction compensation proportional to the differential value of the angular velocity signal ω only when the differential value is close to zero, or outputs a substantially constant current when the differential value is not close to zero.

The currents outputted by the respective dynamic friction compensating unit 24a and static friction compensating unit 24c are added together by an adder (adding means) 24d, and outputted to the adder 25 (FIG. 2).

The following description will explain an operation of the electric power steering apparatus having such structures.

The directing current function unit 73a determines a directing current I for the motor 8 based on the torque detection signal whose phase has been compensated by the phase compensating unit 71a, the change current Ia outputted by the change current function unit 73c and the vehicle speed detection signal outputted by the vehicle speed detector 18, and outputs the determined directing current I.

Meanwhile, the change current function unit 73c determines a change current Ia for changing the characteristic of the directing current I, based on the steering angle θ given by the steering angle determining unit 71d and the vehicle speed detection signal outputted by the vehicle speed detector 18, and outputs the determined change current Ia.

The angular acceleration calculating unit 71b reads a torque detection signal T supplied from the torque sensor 6 and a motor rotational speed $\omega_m$ of the motor 8 supplied from the rotation detector 17, and calculates the angular acceleration ω' of the steering wheel according to the following equation.

$$\omega' = T''/K + \omega_m'/n \quad (1)$$

Here, equation (1) can be given by the following equations.

$$T = K(\theta_i - \theta_o)$$

where
- $\theta_i$: a steering angle of the upper shaft of the steering shaft,
- $\theta_o$: a steering angle of the lower shaft of the steering shaft,
- K: a spring constant of the torsion bar.

$$\theta_i - \theta_o = T/K$$

$$\theta_i'' - \theta_o'' = T''/K$$

$$\theta_i'' = T''/K + \theta_o'' \quad (2)$$

Meanwhile, $$\theta_o' = \omega_m/n$$

$$\theta_o'' = \omega_m'/n$$

(n: the deceleration ratio of the motor rotation shaft to the lower shaft)

∴ According to equation (2), $$\theta_i'' = \omega' = T''/K + \omega_m'/n \quad (1)$$

The correction current function unit 73b calculates a predetermined correction current Ic for correcting the effects of the force of inertia of the motor 8 and the force of inertia of the traveling system of the vehicle, based on the angular acceleration ω' calculated by the angular acceleration calculating unit 71b and vehicle speed detection signal V outputted by the vehicle speed detector 18.

The angular velocity calculating unit 23 calculates an angular velocity of the steering wheel by differentiating the angle signal supplied from the angle detector 20, and outputs an angular velocity signal to the friction compensating unit 24.

In the friction compensating unit 24, the dynamic friction compensating unit 24a outputs a substantially constant current for dynamic friction compensation when the angular velocity signal ω is not close to zero, and the differentiation calculating unit 24b differentiates the angular velocity signal ω and supplies the resultant differential value to the static friction compensating unit 24c. The static friction compensating unit 24c outputs a current for static friction compensation proportional to the differential value of the angular velocity signal ω only when the differential value is close to zero, or outputs a substantially constant current when the differential value is not close to zero.

The friction compensating unit 24 adds up the currents outputted by the respective dynamic friction compensating unit 24a and static friction compensating unit 24c by the adder 24d, and outputs the resultant current to the adder 25.

The adder 74a adds the correction current Ic calculated by the correction current function unit 73b to the directing current I calculated by the directing current function unit 73a, and outputs the resultant current. Consequently, the correction current Ic corresponding to the force of inertia of the motor 8 and the force of inertia of the traveling system of the vehicle is added to the directing current I.

The adder 25 adds the current outputted by the friction compensating unit 24 to the current outputted by the adder 74a, and supplies the resultant signal to the error amplifier 74b.

The error amplifier 74b calculates the difference between the current supplied from the adder 25 and a current flowing in the motor 8 detected by the current detecting circuit 71e, and supplies a voltage corresponding to the calculation result to the PWM driving circuit 72a. The PWM driving circuit 72a controls driving of the motor 8 according to the supplied voltage.

Second Embodiment

Figure 4:
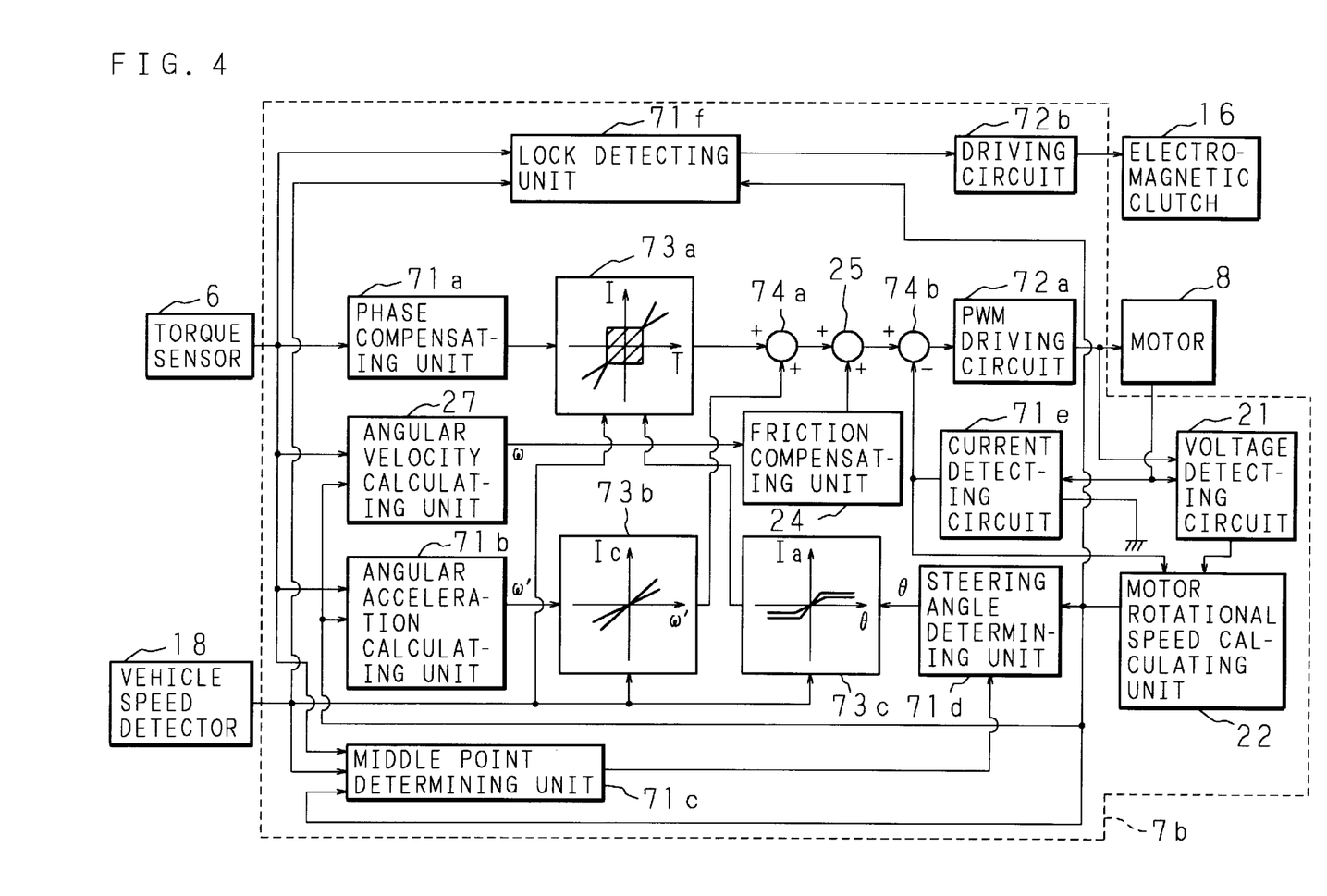
FIG. 4 is a block diagram showing the constitution of an embodiment of an electric power steering apparatus according to the present invention.

FIG. 4 is a block diagram showing the constitution of the Second Embodiment of an electric power steering apparatus according to the present invention. In this electric power steering apparatus, an output signal of the torque sensor 6 is inputted to a control unit 7b. The control unit 7b supplies a drive signal to the steering assist motor 8 based on this output signal. The steering assist motor 8 transmits its torque to the lower shaft of the steering shaft.

The control unit 7b is supplied with an output signal of the vehicle speed detector 18 for detecting a vehicle speed as well as the above-mentioned output signal of the torque sensor 6, and outputs a drive signal for driving the motor 8 and electromagnetic clutch 16.

In the control unit 7b, a torque detection signal outputted by the torque sensor 6 is supplied to each of the phase compensating unit 71a, angular acceleration calculating unit (angular acceleration calculating means) 71b, middle point determining unit 71c, lock detecting unit 71f for detecting whether the motor 8 is locked, and angular velocity calculating unit 27 (angular velocity calculating means).

In this electric power steering apparatus, instead of the rotation detector 17 (FIG. 2), a motor rotational speed calculating unit (motor rotational speed calculating means) 22 within the control unit 7b calculates a motor rotational speed $\omega_m$ (=$2\pi$N, N: motor rotations per second) based on a motor current from the current detecting circuit 71e for detecting a current flowing in the motor 8 and a motor voltage from a voltage detecting circuit 21 for detecting a voltage applied to the motor 8.

Figure 5:
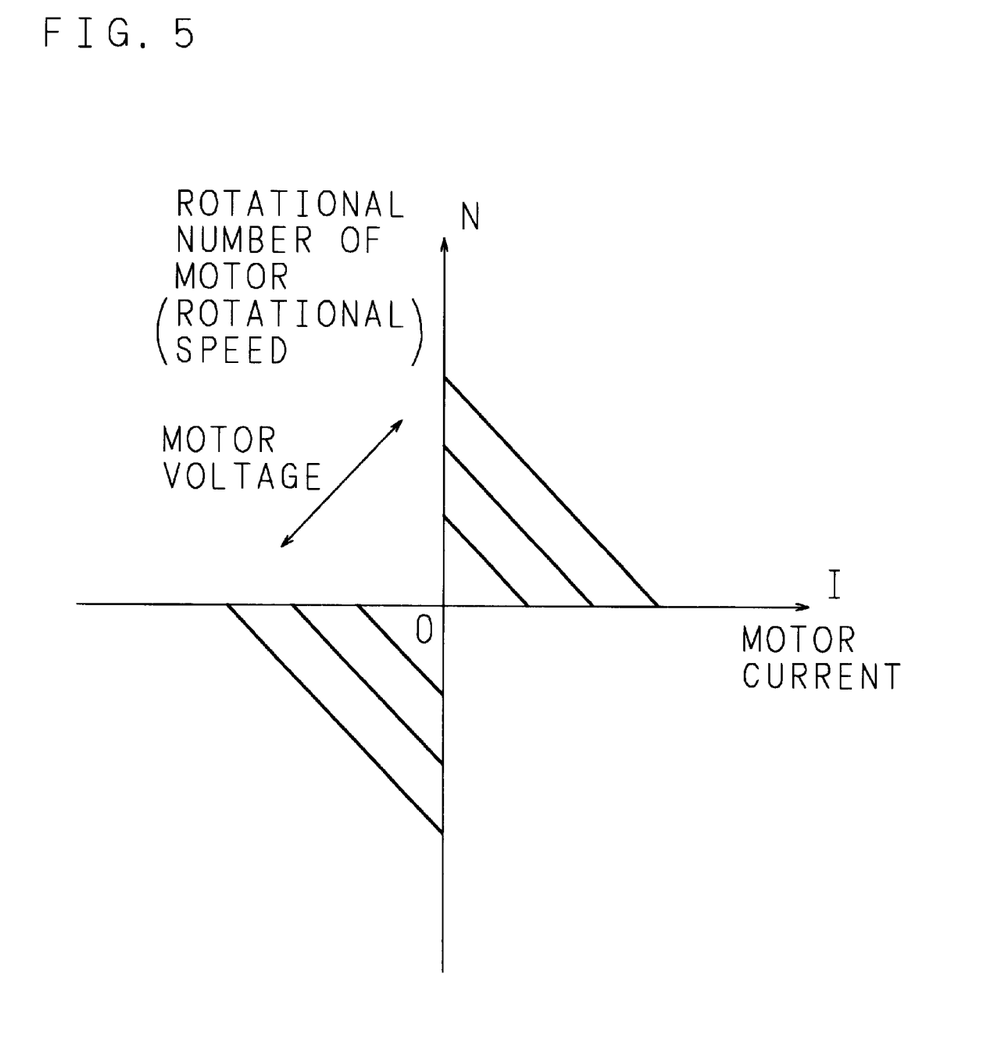
FIG. 5 is a graph showing the relationship among a motor current, motor voltage and motor rotational speed.

The motor rotational speed $\omega_m$ can be calculated from the relationship among the motor current, motor voltage and motor rotational speed $\omega_m$ as shown in FIG. 5. The relationship shown in FIG. 5 can be readily obtained from the characteristics of so-called T-N curve (torque-rotations curve) and T-I curve (torque-current curve) of a DC motor.

The motor rotational speed $\omega_m$ calculated by the motor rotational speed calculating unit 22 is supplied to the lock detecting unit 71f, middle point determining unit 71c, steering angle determining unit 71d and angle velocity calculating unit 27.

The steering angle determining unit 71d determines a steering angle θ from the motor rotational speed $\omega_m$ and the middle point determined by the middle point determining unit 71c, and outputs the determined steering angle θ.

The lock detecting unit 71f detects whether the motor 8 is locked, based on the motor rotational speed $\omega_m$, when the supplied torque detection signal and vehicle speed detection signal are larger than their predetermined values, respectively. When the lock detecting unit 71f detects that the motor 8 is locked, the driving circuit 72b disconnects the electromagnetic clutch 16.

The angular velocity calculating unit 27 calculates an angular velocity of the steering wheel from the supplied motor rotational speed $\omega_m$ and torque detection signal, and outputs an angular velocity signal. The angular velocity signal of the steering wheel outputted by the angular velocity calculating unit 27 is supplied to the friction compensating unit 24. The friction compensating unit 24 generates a current for friction compensation based on the supplied angular velocity signal, and outputs the current. Other structures are the same as those of the electric power steering apparatus explained in the First Embodiment, and therefore similar parts will be designated with the same reference symbols and explanation thereof will be omitted.

The following description will explain an operation of the electric power steering apparatus having such structures.

The directing current function unit 73a determines a directing current I for the motor 8 based on the torque detection signal whose phase has been compensated by the phase compensating unit 71a, the change current Ia outputted by the change current function unit 73c and the vehicle speed detection signal outputted by the vehicle speed detector 18, and outputs the determined directing current I.

Meanwhile, the change current function unit 73c determines a change current Ia for changing the characteristic of the directing current I, based on the steering angle θ given by the steering angle determining unit 71d and the vehicle speed detection signal outputted by the vehicle speed detector 18, and outputs the determined change current Ia.

The motor rotational speed calculating unit 22 calculates a motor rotational speed $\omega_m$ from the relationship shown in FIG. 5, based on the motor current from the current detecting circuit 71e and the motor voltage from the voltage detecting circuit 21.

The angular acceleration calculating unit 71b reads the torque detection signal T supplied from the torque sensor 6 and the motor rotational speed $\omega_m$ of the motor 8 supplied from the rotational speed calculating unit 22, and calculates the angular acceleration ω' of the steering wheel according to the following equation.

$$\omega' = T''/K + \omega_m'/n \tag{1}$$

The correction current function unit 73b calculates a predetermined correction current Ic for correcting the effects of the force of inertia of the motor 8 and the force of inertia of the traveling system of the vehicle, based on the angular acceleration $\omega'$ calculated by the angular acceleration calculating unit 71b and the vehicle speed detection signal V outputted by the vehicle speed detector 18.

The angular velocity calculating unit 27 calculates an angular velocity $\omega$ of the steering wheel according to the following equation based on the motor rotational speed $\omega_m$ given by the motor rotational speed calculating unit 22 and the torque detection signal T from the torque sensor 6.

$$\omega = T'/K + \omega_m/n \tag{3}$$

Here, equation (3) can be given by the following equations.

$$T = K(\theta_i - \theta_o)$$

where
- $\theta_i$: a steering angle of the upper shaft of the steering shaft,
- $\theta_o$: a steering angle of the lower shaft of the steering shaft,
- K: a spring constant of the torsion bar.

$$\theta_i - \theta_o = T/K$$

$$\theta_i' - \theta_o' = T'/K$$

$$\theta_i' = T'/K + \theta_o' \tag{4}$$

Meanwhile,
$\theta_o' = \omega_m/n$
(n: the deceleration ratio of the motor rotation shaft to the lower shaft)
∴ According to equation (4), $$\theta_i' = \omega = T'/K + \omega_m/n \tag{3}$$

The angular velocity calculating unit 27 supplies the calculated angular velocity $\omega$ of the steering wheel to the friction compensating unit 24. Other operations are the same as those of the electric power steering apparatus explained in the First Embodiment, and therefore explanation thereof will be omitted.

Third Embodiment

Figure 6:
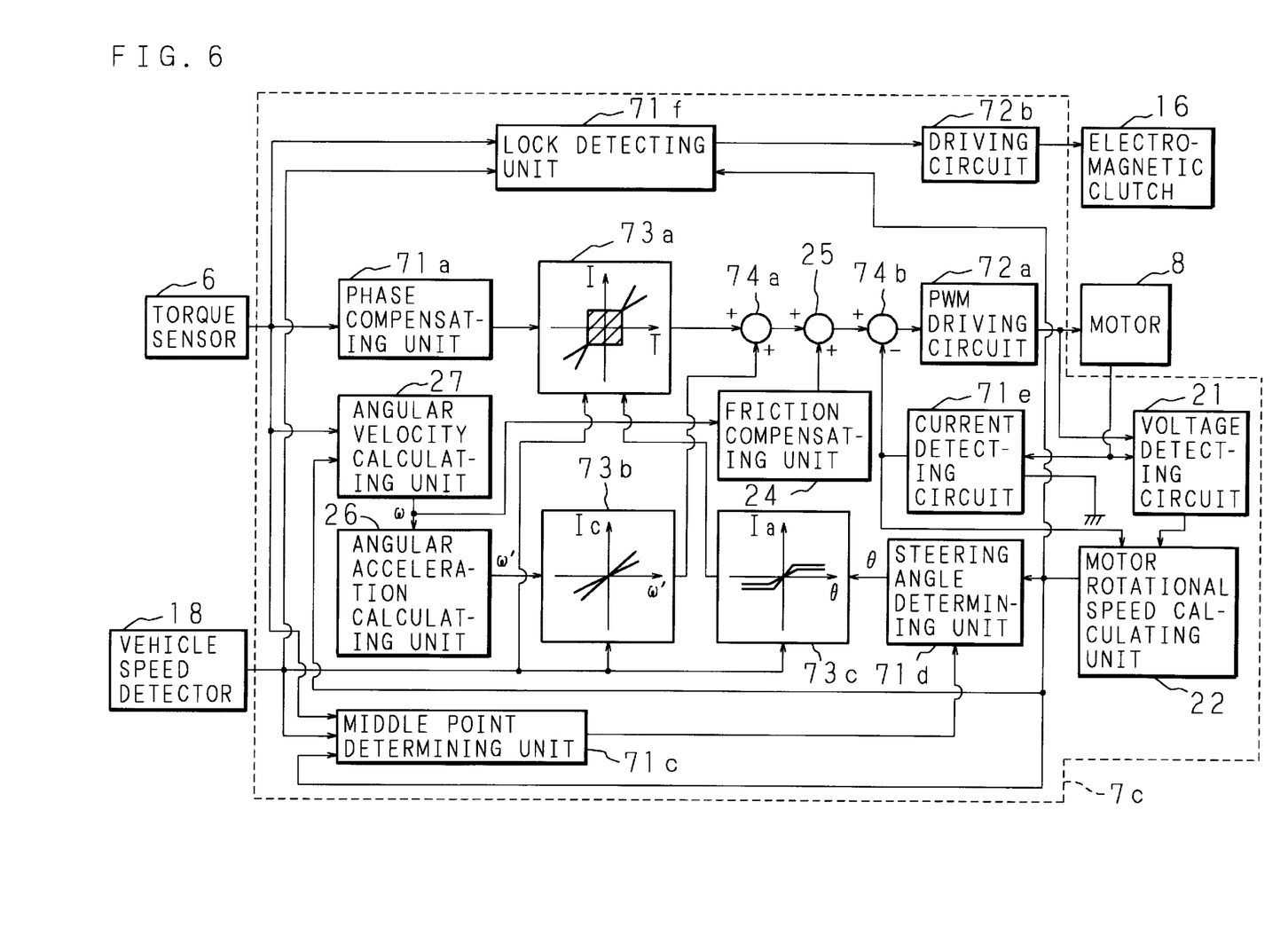
FIG. 6 is a block diagram showing the constitution of an embodiment of an electric power steering apparatus according to the present invention.

FIG. 6 is a block diagram showing the constitution of the Third Embodiment of an electric power steering apparatus according to the present invention. In this electric power steering apparatus, an output signal of the torque sensor 6 is inputted to a control unit 7c. The control unit 7c supplies a drive signal to the steering assist motor 8 based on this output signal. The steering assist motor 8 transmits its torque to the lower shaft of the steering shaft.

The motor rotational speed $\omega_m$ calculated by the motor rotational speed calculating unit 22 and the torque detection signal T from the torque sensor 6 are supplied to the angular velocity calculating unit 27. The angular velocity calculating unit 27 calculates an angular velocity of the steering wheel from the supplied motor rotational speed $\omega_m$ and torque detection signal T, according to equation (3) shown above, and outputs the angular velocity. The angular velocity signal of the steering wheel outputted by the angular velocity calculating unit 27 is supplied to the friction compensating unit 24 and angular acceleration calculating unit 26. The friction compensating unit 24 generates a current for friction compensation, based on the supplied angular velocity signal, and outputs the current. The angular acceleration calculating unit 26 calculates an angular acceleration signal $\omega'$ of the steering wheel by differentiating the supplied angular velocity signal $\omega$, and outputs the angular acceleration signal $\omega'$.

The correction current function unit 73b calculates a predetermined correction current Ic for correcting the effects of the force of inertia of the motor 8 and the force of inertia of the traveling system of the vehicle, based on the angular acceleration $\omega'$ calculated by the angular acceleration calculating unit 26 and the vehicle speed detection signal V outputted by the vehicle speed detector 18. Other structures and operations are the same as those of the electric power steering apparatus explained in the Second Embodiment, and therefore parts having similar structures will be designated with the same reference symbols and explanation thereof will be omitted.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus being provided with a torque detector for detecting a steering torque applied to a steering wheel and a steering assist motor which is driven under control based on a drive current corresponding to the steering torque detected by said torque detector, comprising:

an angle detector for detecting a turn angle of said steering wheel;

angular velocity calculating means for calculating an angular velocity of turn of said steering wheel from the turn angle detected by said angle detector;

friction compensating means for calculating an angular acceleration of turn of said steering wheel for friction compensation from the angular velocity of turn calculated by said angular velocity calculating means; and adding means for adding a current related to said angular velocity of turn and a current related to the angular acceleration of turn calculated by said friction compensating means to said drive current.

2. An electric power steering apparatus being provided with a torque detector for detecting a steering torque applied to a steering wheel and a steering assist motor which is driven under control based on a drive current corresponding to the steering torque detected by said torque detector, comprising:

a current detecting circuit for detecting a current flowing in said motor;

a voltage detecting circuit for detecting a voltage applied to said motor;

motor rotational speed calculating means for calculating a rotational speed of said motor based on the current detected by said current detecting circuit and the voltage detected by said voltage detecting circuit;

angular acceleration calculating means for calculating an angular acceleration of turn of said steering wheel by adding up a value corresponding to first-order differentiation of the rotational speed calculated by said motor rotational speed calculating means and a value corresponding to second-order differentiation of said steering torque; and adding means for adding a current determined in relation to the angular acceleration of turn calculated by said angular acceleration calculating means to said drive current.

3. An electric power steering apparatus being provided with a torque detector for detecting a steering torque applied to a steering wheel and a steering assist motor which is driven under control based on a drive current corresponding to the steering torque detected by said torque detector, comprising:

a current detecting circuit for detecting a current flowing in said motor;

a voltage detecting circuit for detecting a voltage applied to said motor;

motor rotational speed calculating means for calculating a rotational speed of said motor based on the current detected by said current detecting circuit and the voltage detected by said voltage detecting circuit;

angular velocity calculating means for calculating an angular velocity of turn of said steering wheel by adding up a value related to the rotational speed calculated by said motor rotational speed calculating means and a value related to first-order differentiation of said steering torque;

angular acceleration calculating means for calculating an angular acceleration of turn of said steering wheel from the angular velocity of turn calculated by said angular velocity calculating means; and adding means for adding a current related to said angular velocity of turn and a current related to the angular acceleration of turn calculated by said angular acceleration calculating means to said drive current.

* * * * *